(12) United States Patent  (10) Patent No.: US 8,059,927 B2
Fenwick et al.  (45) Date of Patent: Nov. 15, 2011

(54) OPTICAL CONNECTIONS AND METHODS OF FORMING OPTICAL CONNECTIONS

(75) Inventors: David Martin Fenwick, Chelmsford, MA (US); Richard John Luebs, Windsor, CO (US); Terrel L. Morris, Garland, TX (US); Duane A. Wegher, Ft. Collins, CO (US); Jeffrey D. Yetter, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 12/710,336

(22) Filed: Feb. 22, 2010

(65) Prior Publication Data

US 2010/0150502 A1 Jun. 17, 2010

Related U.S. Application Data

(62) Division of application No. 12/170,398, filed on Jul. 9, 2008, now Pat. No. 7,693,362, which is a division of application No. 10/980,595, filed on Nov. 3, 2004, now Pat. No. 7,400,790.

(51) Int. Cl.
  *G02B 6/12* (2006.01)
  *G02B 6/36* (2006.01)
  *G02B 6/04* (2006.01)
(52) U.S. Cl. ............... 385/14; 385/88; 385/89; 385/90; 385/115
(58) Field of Classification Search ........... 385/14, 385/88–91, 115, 120
See application file for complete search history.

(56) References Cited

U.S. PATENT DOCUMENTS

| | | | |
|---|---|---|---|
| 5,093,879 A * | 3/1992 | Bregman et al. | 385/93 |
| 5,513,021 A | 4/1996 | Kaneshiro | |
| 5,631,988 A | 5/1997 | Swirhun | |
| 5,835,196 A | 11/1998 | Jackson | |
| 5,848,214 A | 12/1998 | Haas | |
| 6,022,671 A | 2/2000 | Binkley | |
| 6,144,779 A | 11/2000 | Binkley | |
| 6,334,784 B1 | 1/2002 | Howord | |
| 6,449,417 B1 | 9/2002 | Binkley | |
| 6,452,705 B1 | 9/2002 | Paxton | |
| 6,454,470 B1 | 9/2002 | Dworkin | |
| 6,474,860 B2 | 11/2002 | Wojnarowski | |

(Continued)

FOREIGN PATENT DOCUMENTS

JP   55-156902   6/1980

(Continued)

OTHER PUBLICATIONS

Preliminary Amendment filed in U.S. Appl. No. 12/017,336 (Jan. 22, 2008); which is a Divisional Application claiming priority to U.S. Appl. No. 10/979,989.

*Primary Examiner* — Ryan Lepisto

(57) ABSTRACT

In one embodiment, an assembly having a first board, a second board, a fiber bundle, and at least one movable stage is provided. The fiber bundle has a first end and a second end, and the first end of the fiber bundle is attached to the first board first face. The movable stage has a second optical array provided thereon or therein. The movable stage is disposed on the second board such that the at least one motor steers the movable stage. The movable stage is steered such that the second optical array is aligned with the second end of the fiber bundle in a desired manner.

23 Claims, 13 Drawing Sheets

U.S. PATENT DOCUMENTS

| | | |
|---|---|---|
| 6,509,992 B1 | 1/2003 | Goodwill |
| 6,562,164 B1 | 5/2003 | Fawlkner |
| 6,619,858 B1 | 9/2003 | Lytel |
| 6,635,861 B1 | 10/2003 | Stone |
| 6,862,381 B2 | 3/2005 | Mitsuhashi |
| 6,912,335 B2 | 6/2005 | Fouquet |
| 6,941,034 B2 * | 9/2005 | Kuboi ............................. 385/17 |
| 6,961,486 B2 | 11/2005 | Lemoff |
| 7,269,321 B2 | 9/2007 | Morris |
| 2002/0106162 A1 | 8/2002 | Loder |
| 2002/0154851 A1 | 10/2002 | Yeh |
| 2002/0159680 A1 | 10/2002 | Mitsuhashi |
| 2004/0000368 A1 | 1/2004 | Kasuga |
| 2004/0057669 A1 | 3/2004 | Botham |
| 2004/0136644 A1 | 7/2004 | Fouquet |
| 2006/0034560 A1 | 2/2006 | Morris |

FOREIGN PATENT DOCUMENTS

JP  02-124512  5/1990

* cited by examiner

OPTICAL CONNECTIONS AND METHODS OF FORMING OPTICAL CONNECTIONS

CROSS-REFERENCE TO RELATED APPLICATIONS

The present application is a divisional application of application Ser. No. 12/170,398, filed Jul. 9, 2008, now U.S. Pat. No. 7,693,362, which in turn is a divisional application of application Ser. No. 10/980,595, filed Nov. 3, 2004, now U.S. Pat. No. 7,400,790, issued Jul. 15, 2008, the contents of both of which are incorporated herein by reference.

BACKGROUND

Fiber optic systems allow signals to be transmitted using light as the signal transmission means, and such fiber optic systems may be used in computer systems to aid in data and signal transmission. The fiber optic systems may be used to provide interconnection between boards, and the fiber optic system may be used to provide fiber to fiber connections as needed. Fiber optic connections and methods of forming fiber optic connections exist in the art. However, it is desirable to provide additional optical connections and methods of forming optical connections.

SUMMARY

In one embodiment, an assembly having a first board, a second board, a fiber bundle, and at least one movable stage is provided. The fiber bundle has a first end and a second end, and the first end of the fiber bundle is attached to the first board first face. The movable stage has a second optical array provided thereon or therein. The movable stage is disposed on the second board such that the at least one motor may steer the movable stage. The movable stage may be steered such that the second optical array is aligned with the second end of the fiber bundle.

BRIEF DESCRIPTION OF THE DRAWINGS

The following detailed description of embodiments of the present invention can be best understood when read in conjunction with the following drawings, where like structure is indicated with like reference numerals and in which.

DETAILED DESCRIPTION OF ILLUSTRATED EMBODIMENTS

Figure 1A:
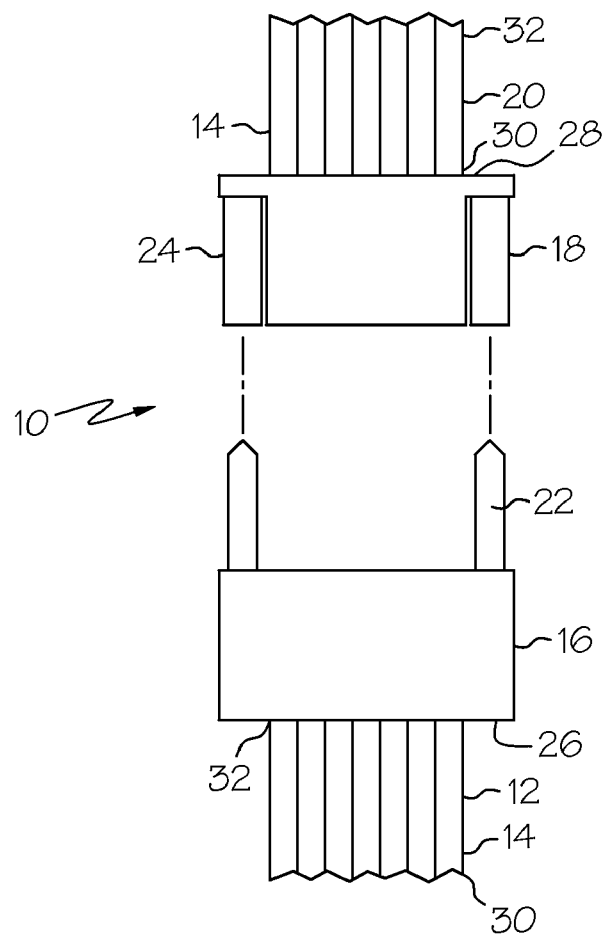
FIGS. 1A-1B illustrate fiber assemblies in accordance with embodiments of the present invention.
Figure 1B:
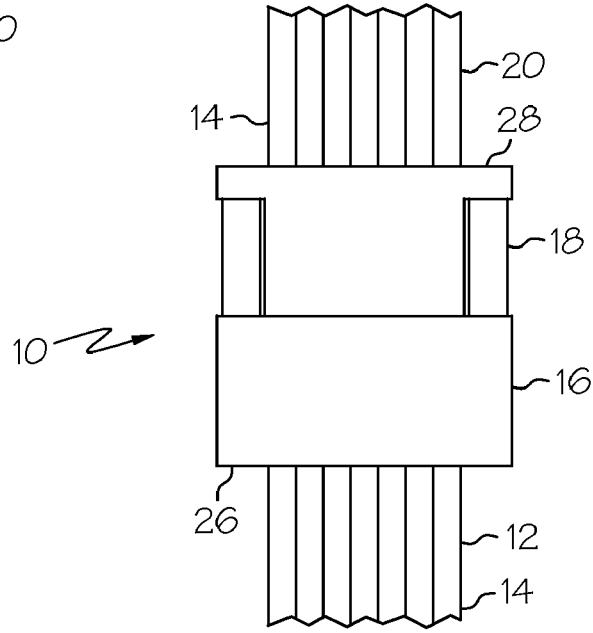

In accordance with embodiments of the present invention, fiber assemblies and methods of forming and connecting fibers are provided. Referring to FIGS. 1A and 1B, a fiber assembly 10 is illustrated. The fiber assembly 10 has a first fiber 12 that has at least one core 14. The fiber assembly 10 comprises a plurality of fibers 12. The core 14 may be made of any suitable material that may transmit light. For example, the core 14 may be made of plastic or glass. The first fiber 12 comprises any suitable fiber optic fiber. The fiber assembly 10 has a second fiber 20 that has at least one core 14. The fiber assembly 10 comprises a plurality of fibers 20.

Figure 2:
FIG. 2 illustrates a core in accordance with embodiments of the present invention.
Figure 3A:
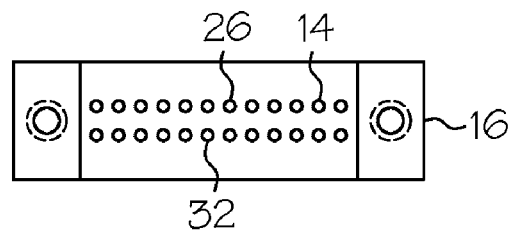
FIGS. 3A-3B are views of connectors in accordance with embodiments of the present invention.
Figure 3B:
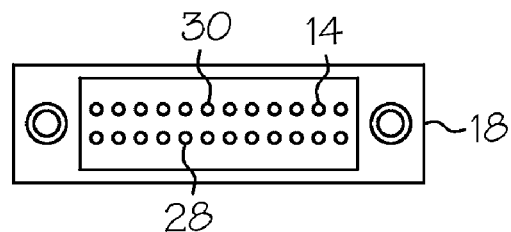

Referring to FIG. 2, the core 14 has a first end 30, a second end 32, and a length L. It will be understood that the core 14 may have any suitable length L between the first end 30 and the second end 32. Referring to FIGS. 1A-1B and FIGS. 3A-3B, the first fiber 12 has a second end 26, and the second end 26 may be proximate to the second ends 32 of the cores 14. For example, the second end 26 of the first fiber 12 may be in about the same position as the second ends 32 of the cores 14, as shown in FIG. 3A. The second fiber 20 has a first end 28 that may be proximate to the first ends 30 of the cores 14. For example, the first end 28 of the second fiber 20 may be in about the same position as the first ends 30 of the cores 14, as shown in FIG. 3B. It will be understood that the fibers and fiber assemblies may be used to transmit a signal, such as a light signal, from one point to another point via the fibers. It will be further understood that light may be emitted from or received by the fibers.

Referring to FIGS. 1A and 1B, the fiber assembly 10 may be in a disengaged position as illustrated in FIG. 1A. Alternatively, the fiber assembly 10 may be in an engaged position as illustrated in FIG. 1B. When the fiber assembly 10 is in an engaged position, the second end 26 of the first fiber 12 may be optically coupled to the first end 28 of the second fiber 20. In this position, light emitted from the first fiber 12 may be transmitted to the second fiber 20. The first fiber 12 and the second fiber 20 may be optically coupled in any suitable manner. For example, the first fiber 12 may have a first connector 16, and the second fiber 20 may have a second connector 18. The first connector 16 may be connected to the second connector 20. It will be understood that any suitable type of connector may be used. For example, as shown in FIG. 1A, the first and second connectors 16 and 18 may be MT style ferrule connectors having alignment pins 22 and alignment holes 24.

Referring to FIGS. 1A, 1B, 4A, and 4B, the cores 14 may have an obtusely angled end surface 34 of at least a portion of the second end 32 of the cores 14 of the first fiber 12. The obtusely angled end surface 34 of the cores 14 increases the surface area of the second end 32 of the core 14. This increased surface area may provide a first fiber 12 that exhibits increased alignment tolerance because the area to be aligned may be increased and because the light exiting the obtusely angled end surface 34 may be refracted over a wider number of angles than light exiting from an end surface that is not obtusely angled. For purposes of describing and defining the present invention, the term "increased alignment tolerance" shall be understood as referring to a fiber or fiber bundle that may be aligned with another desired fiber, fiber, bundle, connector or the like over a wider number of suitable alignment positions than a fiber or fiber bundle that does not exhibit increased alignment tolerance. Further, for purposes of defining and describing the present invention, the term "suitable alignment positions" shall be understood as referring to any alignment positions that allow an acceptable amount of light to be passed from a fiber, fiber bundle, or the like to another fiber, fiber bundle, connector, receiver, or the like.

Figure 4A:
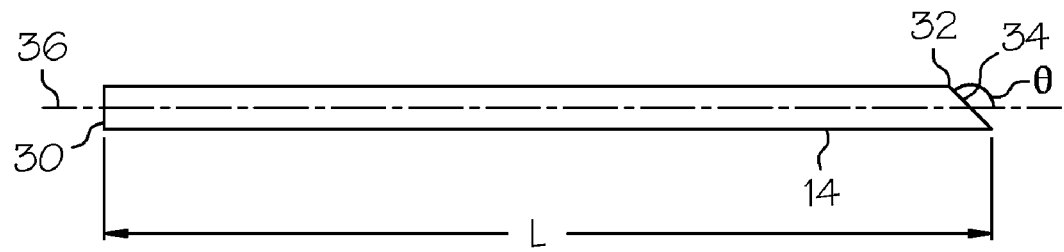
FIGS. 4A-4C illustrate cores having angled end surfaces in accordance with embodiments of the present invention.
Figure 4B:
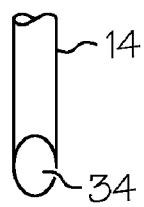

The obtusely angled end surface 34 may be formed in any suitable manner on the cores 14. For example, the obtusely angled end surface 34 may be formed by cutting the second end 32 of the core 14 or machining the second end 32 of the core 14. The core 14 may be described as having a central or horizontal axis 36 that runs through the core 14 parallel to the length L. The obtusely angled end surface 34 may be angled obtusely with respect to the axis 36. Thus, an obtuse angle θ may be formed between the end surface 34 and the axis 36. For example, the obtusely angled end surface 34 may be angled at greater than about 90° to less than about 180° with respect to the axis 34. In a further example, the obtusely angled end surface 34 may be angled at about 101° to about 136° with respect to the axis 34. The core 14 of the first fiber 12 may be cylindrical, and the obtusely angled end surface 34 may be elliptical as shown in FIG. 4B.

Figure 4C:
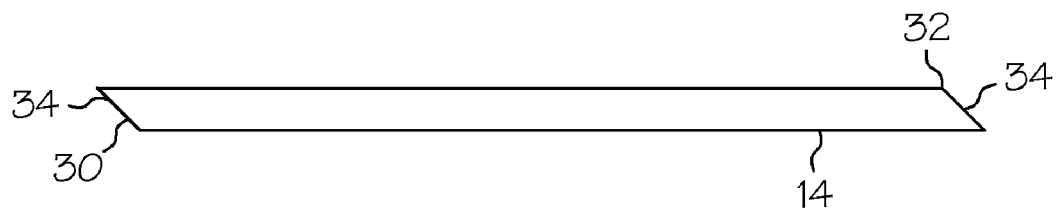
Figure 5A:
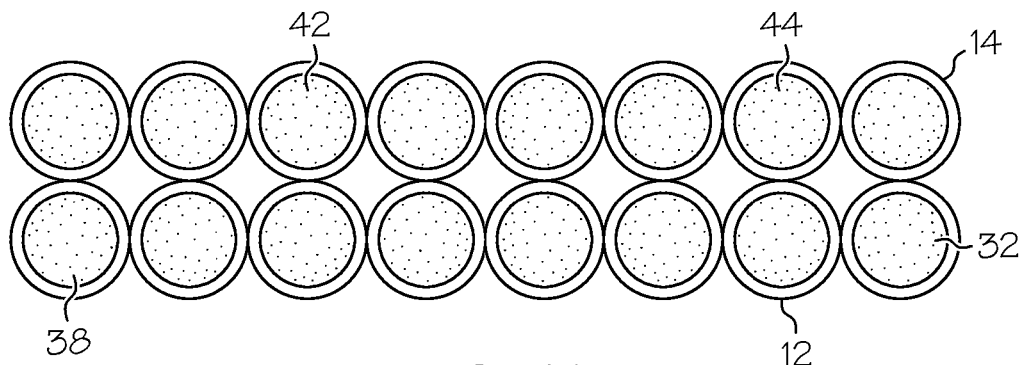
FIGS. 5A-5B illustrate exposed end surfaces of cores having at least one diffusion feature in accordance with embodiments of the present invention.
Figure 5B:
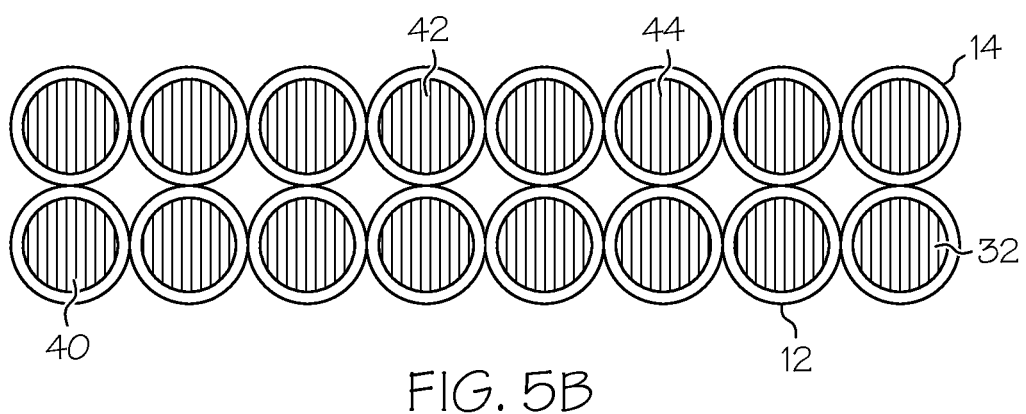

The first fiber 12 may further have an obtusely angled end surface 34 formed on the first end 30 of the core 14 as shown in FIG. 4C. Additionally, the second fiber 20 may have an obtusely angled end surface 34 at the first end 30 and the second end 32 of the core 14 as desired. Further, the second end 26 of the first fiber 12 and the first end 28 of the second fiber 20 may have an index matching material (not shown) disposed between the first end 28 and the second end 26. The index matching material may be selected such that the refractive index of the index matching material is different than the refractive index of air.

The fibers may have at least one surface feature provided on the second end of the at least one core. Referring to FIGS. 1A, 1B, 5A, and 5B, the fiber assembly 10 has at least one core 14 of the first fiber 12, and the core 14 has a second end 32. At least a portion of the second end 32 comprises a first exposed edge 42. For purposes of defining and describing the present invention, the term "exposed edge" shall be understood as referring to an end surface i.e. tip of a core.

At least one diffusion feature 44 may be provided on at least a portion of the first exposed edge 42. The first exposed edge 42 has a first diffusion state when no diffusion features 44 are present. The diffusion feature 44 defines a second diffusion state. The second diffusion state is such that light exiting the first exposed edge 42 having at least one diffusion feature 44 is spread over a greater number of angles relative to the angles said light would spread over if the first exposed edge 42 did not have at least one diffusion feature 44 contained thereon. Thus, the first exposed edge 42 may be modified from a first diffusion state to a second diffusion state. Because the light exiting the core 14 in the second diffusion state is spread over a greater number of angles, the first fiber 12 exhibits increased alignment tolerance because the number of angles at which light can be received is increased. It will be understood that the second diffusion state may be selected to provide a desired range or number of angles depending on the requirements of a particular fiber assembly. It will further be understood, that the first fiber 12 and the second fiber 20 may have diffusion features provided on the first exposed edges 42 of the first and second ends 30, 32 of the cores 14. Additionally, the cores 14 may have a diffusion feature 12 on an obtusely angled end surface 34. The diffusion features 44 may comprise light dispersing geometries.

The fiber assembly 10 may comprise the first fiber 12 aligned with the second fiber 20 in any desired manner. Alternatively, the first fiber 12 may be connected to the second fiber 20 in any suitable manner. The first fiber 12 may be connected to the second fiber 20 so that the fibers are aligned such that at least a portion of light exiting the second end 32 of the core 14 of the first fiber 12 enters the core 14 at the first end 30 of the second fiber 20. The first end 30 of the core 14 of the first fiber 12 may have at least one diffusion feature 44. Additionally, the first end 30 and/or second end 32 of the core 14 may have at least one diffusion feature 44.

The diffusion features 44 may be any suitable diffusion feature. For example, the diffusion features 44 may be formed in any suitable random pattern such as the pattern 38 illustrated in FIG. 5A. The diffusion features 44 may be formed in an ordered pattern such as the pattern 40 shown in FIG. 5B. The ordered pattern may be any suitable ordered pattern. For example, the ordered pattern may be in the form of a grating, facets, or diffraction grating, and the grating may be a fresnel lens. The diffusion features 44 may be formed in any suitable manner. For example, the diffusion features 44 may be formed by blasting, sandblasting, machining, grinding, etching, laser cutting, molding, and molding facets onto the first exposed edge 42 of the core 14.

Figure 6:
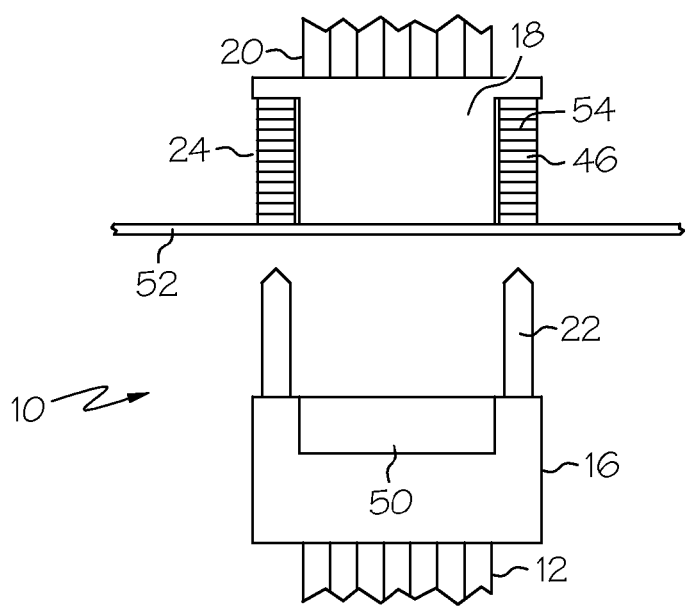
FIG. 6 illustrates a fiber assembly incorporating at least one magnet in accordance with embodiments of the present invention.

The fiber assemblies may have at least one magnet incorporated therein. Referring to FIGS. 1A, 1B, and 6, a fiber assembly 10 has a first connector 16 on the first fiber 12 and a second connector 18 on the second fiber 20 as discussed herein. The second connector 18 has at least one magnet 46 disposed therein. The magnet 46 may be operated to engage the first connector 16 to the second connector 18. For example, the magnet 46 may be operated such that the first connector 16 moves toward the second connector 18 and engages the second connector 18. The first connector 16 may have a portion that may be magnetically attracted. The magnet 46 may be operated such that the first connector 16 and the second connector 18 remain statically engaged. The magnet 46 may further be operated such that the first connector 16 and the second connector 18 are disengaged after being engaged. It will be understood that the fiber assembly 10 could alternatively have a magnet 46 in the first connector 16. Additionally, the first connector 16 may have a magnet 50, and the magnet 50 may be a permanent magnet that ensures the static engagement of the first connector 16 and the second connector 18. The second connector 18 may have a magnetically attractive element (not shown) disposed thereon or therein the may allow the magnet 50 to be statically engaged to the second connector 18. For example, the second connector 18 may have a magnet with reverse polarity to the magnet 50 or a magnetically attractive area such as a ferrous sleeve around a portion of the connector 18. Alternatively, the magnet 50 could comprise a reverse polarity magnet, and the polarity could be reversed to disengage the first connector 16 and the second connector 18 after engagement. The second fiber 20 may be mounted to or engaged to a planar member 52 such as a bulkhead, and the first connector 16 may pass through the planar member 52 to engage the second connector 18.

The magnet 46 may be any suitable type of magnet. For example, the magnet 46 may comprise a hollow wire coil connected to a power source to form an air core electromagnet. The magnet 46 may be an iron core electromagnet with a hollow area in the core shaped to accept an alignment pin 22. Alternatively, the magnet 46 may comprise any other suitable type of electromagnet. For example, the magnet 46 could be operated in an AC fashion to provide an alignment force and to engage the first connector 16 and the second connector 18, and the magnet 46 could be subsequently operated in a DC fashion to maintain static engagement. When the magnet 46 comprises an electromagnet, the magnet 46 may be operated electromagnetically to engage the first connector 16 by providing a magnetic force that attracts the first connector 16. Additionally, the power to the magnet 46 may be turned off to disengage the first connector 16 after the first connector 16 and the second connector 18 are engaged. The first connector 16 may additionally have at least one permanent magnet 50 that may cause the first connector 16 and the second connector 18 to remain statically engaged even after power to an electromagnet in the second connector 18 is turned off.

The first connector 16 and the second connector 18 may comprise any suitable types of connectors. For example, the connectors could be MT ferrule type connectors as discussed above. As shown in FIG. 6, the second connector 18 may have two magnets 46 having wires 54 around a hollow area forming a hollow wire coil. The first connector 16 may have two alignment pins 22 disposed to align with the hollow wire coils 46, and the first connector 16 and the second connector 18 may be engaged by inserting the alignment pins 22 into the hollow wire coils 46. The alignment pins 22 may be magnetically attractive. It will be understood that the second connector 18 may have any desired number of hollow wire coils 46 and the first connector 16 may have any desired number of alignment pins 22. The magnets 46 may be operated to provide a magnetic force that draws the alignment pins 22 into the hollow wire coils 46.

Figure 7A:
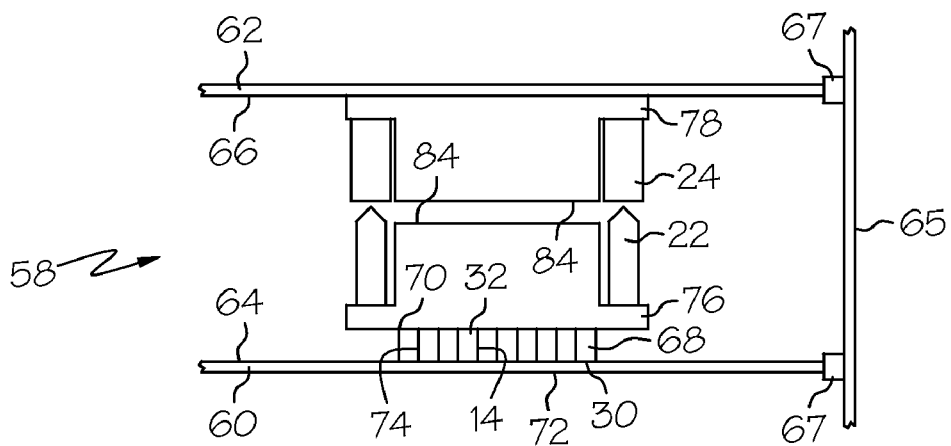
FIGS. 7A-7C illustrate board assemblies in accordance with embodiments of the present invention.
Figure 7B:
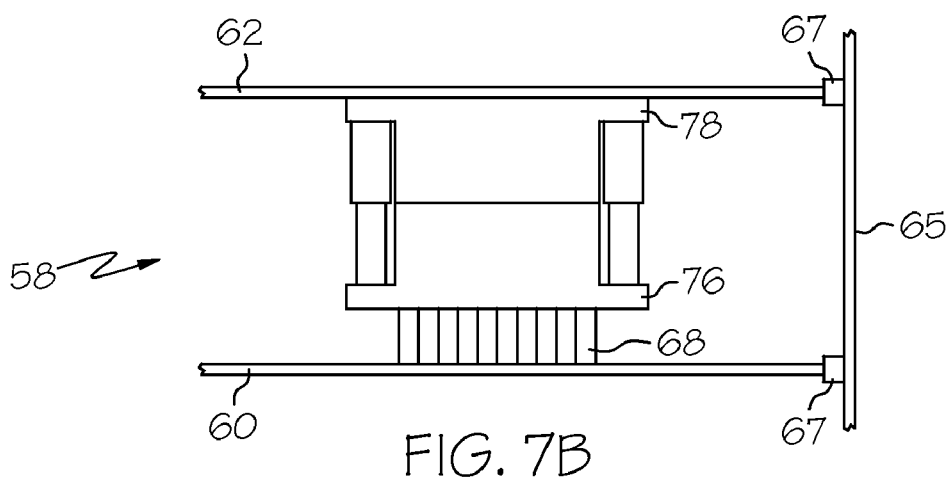
Figure 7C:
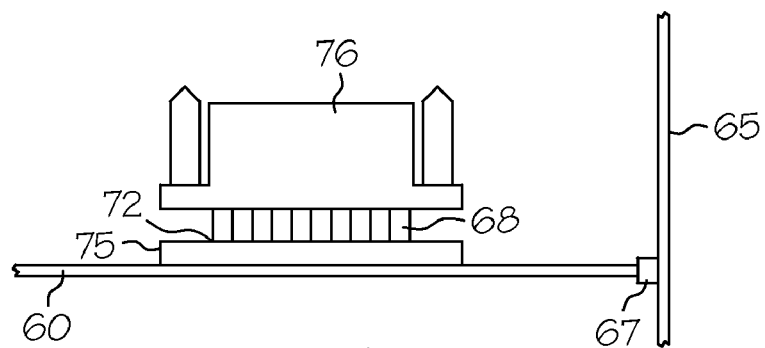

In accordance with embodiments of the present invention, board assemblies and methods of connecting boards are provided. Referring to FIG. 7A-7C, a board assembly is illustrated. The board assembly 58 has a first board 60 having a first face 64 and a second board 62 having a second face 66. The first and second board 60, 62 may be connected by a connector 67 to a backplane 65. However, it will be understood that the first and second boards 60, 62 may be configured in any other suitable manner and may be connected to any suitable structure. The assembly has a fiber bundle 68 having a first end 72 and a second end 70. The fiber bundle has a plurality of fibers 74. Each of the plurality of fibers has a core 14 as illustrated in FIG. 2 and as discussed above. The cores 14 have first ends 30 proximate to the first end 72 of the fiber bundle, and the cores 14 have second ends 32 proximate to the second end 70 of the fiber bundle 68. The first end 72 of the fiber bundle 68 is connected to the first board 60 first face 64, and the second end 70 of the fiber bundle 68 has a first connector 76. The first end 72 of the fiber bundle 68 may be connected to the first board 60 first face 64 in any suitable manner. For example as shown in FIG. 7C, the first end 72 of the fiber bundle 68 may be connected to a connector portion 75 that is connected to the first board 60. The assembly 58 has a second connector 78 on the second board 62 first face 66.

The first board 60 may be parallel to the second board 62. Additionally, the first face 64 of the first board 60 may face the first face 66 of the second board 62. The boards 60, 62 may comprise any suitable board type. For example, the boards 60, 62 may comprise printed circuit boards or electronic circuit boards. The first connector 76 may be connected to the second connector 78 as shown in FIG. 7B. Alternatively, the first connector 76 and the second connector 78 may be in a disengaged position as shown in FIG. 7A. It will be understood that when the first connector 76 and the second connector 78 are engaged an optical signal may be transmitted from the first board 60 to the second board 62 or from the second board 62 to the first board 60. Thus, the boards 60, 62 may be in optical communication.

Referring now to FIGS. 7A, 7B, 9A, and 9B, the first connector 76 may comprise a plurality of first array positions 80. The first array positions 80 may correspond to the positions of the plurality of fibers 74 in the fiber bundle 68, and light may exit from or enter into the fiber bundle 68 in the plurality of first array positions 80. Additionally, the first array positions 80 may correspond to positions (not shown) on the first board 60 first face 64. The positions defined on the first board 60 first face 64 may correspond to emitters or receivers that may emit or receive a signal, such as an optical signal. The emitters or receivers may be used to establish optical communication. Thus, the first connector 76 may be connected to at least one emitter or receiver via the fiber bundle 68. The first array positions 80 may be defined on the first connector 76 on a mating face 84 of the first connector 76.

The second connector 78 may comprise a plurality of second array positions 82. The second array positions 82 may be defined on a mating face 84 of the second connector 78. Additionally, the second array positions 82 may correspond to positions (not shown) on the second board 62 first face 66, and the positions on the second board 62 first face 66 may correspond to emitters or receivers/detectors that may emit or receive a signal. Thus, the second connector 78 may be connected to at least one emitter or receiver. The second array positions 82 may be configured such that an optical signal such as light may enter or exit the second array positions 82. It will be understood that the first array positions 80 and the second array positions 82 may have any suitable configuration, and the illustrated configuration comprises only one of the possible configurations.

The first connector 76 may be aligned with or connected to the second connector 78 such that at least one position of the plurality of first array positions 80 is aligned with a desired at least one position of the plurality of second array positions 82. For example, referring to FIGS. 10A-10C, one or more positions of the plurality of first array positions 80 may be aligned with one or more positions of the plurality of second array positions 80. Thus, a receiver could be aligned with an emitter via the fiber bundle 68 and the boards 60, 62. In a further example, the first array positions 80 may be aligned with the second array positions 82 such that at least a portion of light exiting from the fiber bundle 68 in the plurality of first array positions 80 is received by the plurality of second array positions 82. In still a further example, optical communication via the fiber bundle 68 may be established between the first board 60 and the second board 62 when the first connector 76 and the second connector 78 are connected.

Figure 8:
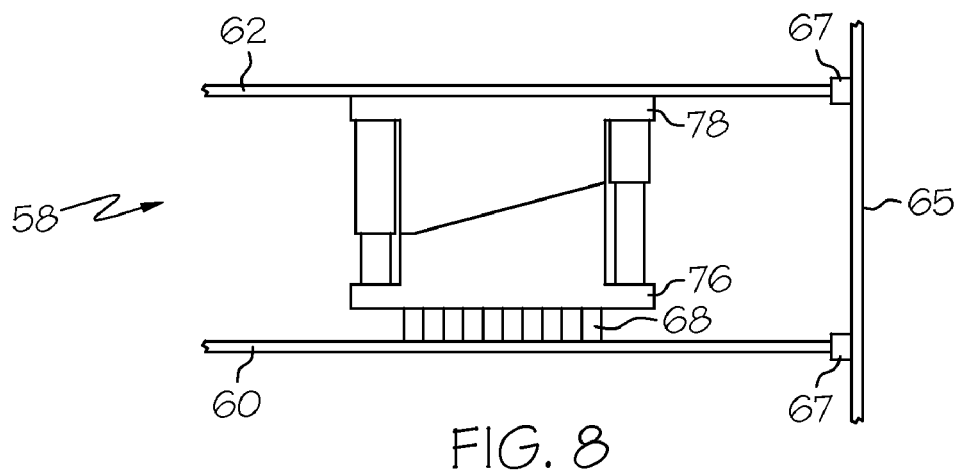
FIG. 8 illustrates another board assembly in accordance with an embodiment of the present invention.
Figure 9A:
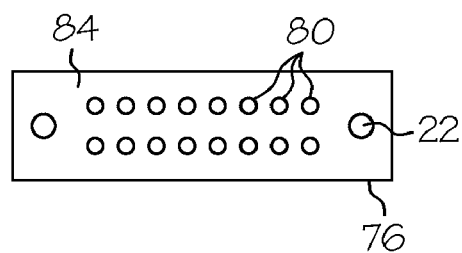
FIGS. 9A-9B are illustrations of connectors in accordance with embodiments of the present invention.
Figure 9B:
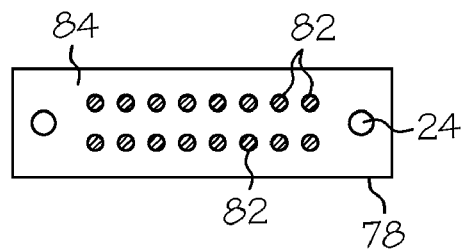

Referring to FIGS. 4A-4C, 7A, and 7B the cores 14 of the fiber bundle 68 board assembly 58 may have obtusely angled end surfaces 34 at the second ends 32 of the cores 14. The obtusely angled end surfaces 34 and methods of forming the obtusely angled end surfaces 34 are described herein with respect to the fiber assemblies 10. Additionally, the first ends 30 of the cores 14 may have obtusely angled end surfaces 34. The first connector 76 and the second connector 78 may be any suitable type of connector. For example, the first connector 76 and the second connector 78 may be MT style ferrule connectors as discussed above. Alternatively, referring to FIG. 8, the first connector 76 and the second connector 78 may have some other shape, such as wedge shaped connectors as shown. The wedge shaped connectors allow the fiber bundle 68 to be connected to the second connector 78 by steering the fiber bundle 68 in one direction with respect to the second connector 78.

Referring to FIGS. 5A, 5B, 7A, and 7B, the board assembly 58 may have at least one diffusion feature 44 on a first exposed edge 42 of the second end 32 of the cores 14. The diffusion features 44 and methods of forming the diffusion features 44 are described herein with respect to the fiber assemblies 10. Thus, the first exposed edge 42 of the second end 32 of the cores 14 may be modified from a first diffusion state to a second diffusion state. Additionally, the first ends 30 of the cores 14 may have at least one diffusion feature 44 on the first exposed edge 42.

Referring to FIGS. 7A-7C, 11A, 11B, and 11C, the board assembly 58 may comprise at least one first magnet 46. The first connector 76 or the second connector 78 may comprise the magnet 46, and the magnet 46 may be operated to engage the first connector to the second connector. The magnet 46 and methods of operating the magnet 46 are described herein with respect to the fiber assemblies 10. It will be understood that the magnet 46 may be operated such that the first connector 76 and the second connector 78 are engaged or disengaged, as already described herein. In one embodiment, the second connector 78 may comprise at least one hollow wire coil comprising the magnet 46, and the first connector 76 may have an alignment pin 22 disposed to align with the hollow wire coil 46. The first connector 76 and the second connector 78 may be engaged by operating the magnet 46 to draw the alignment pin 22 into the hollow wire coil 46 by a magnetic force.

Figure 11A:
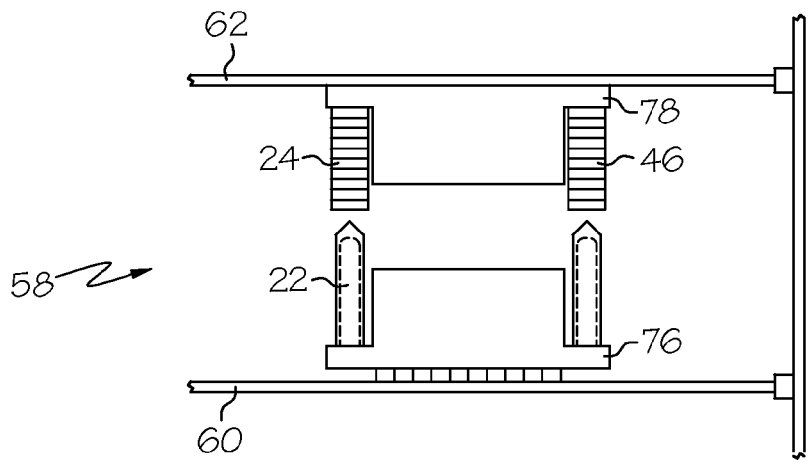
FIGS. 11A-11C illustrate board assemblies incorporating a magnet in accordance with embodiments of the present invention.
Figure 11B:
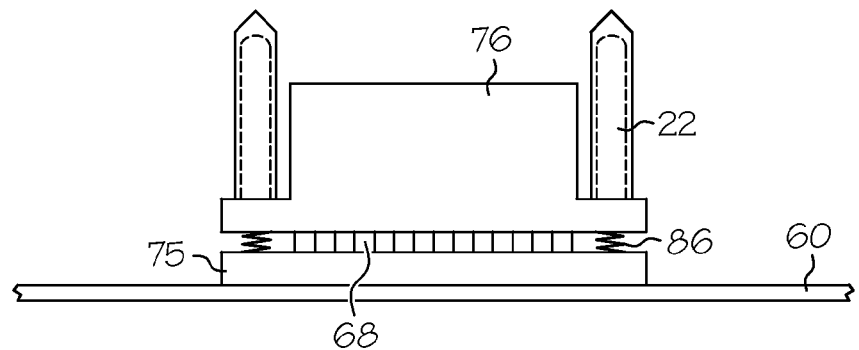
Figure 11C:
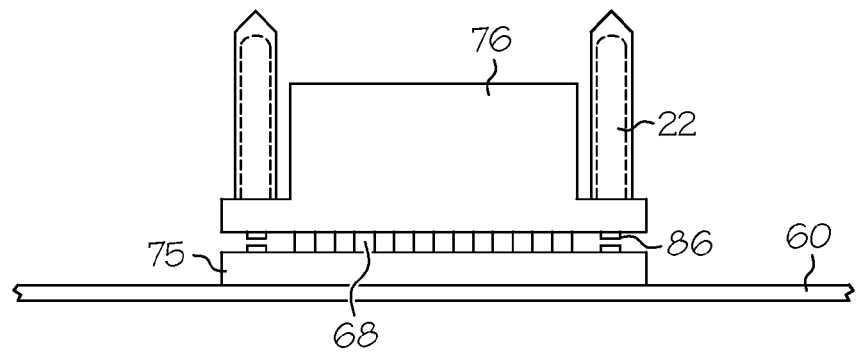

The fiber bundle 68 may be connected to the first board 60 by a connector portion 75 as described herein. The connector portion 75 may have an engagement member 86 disposed between the connector portion 75 and the first connector 76. The engagement member 86 may be any suitable member that allows the first connector 76 to move in relation to the connector portion 75. For example, the engagement member 86 may comprise at least one spring as shown in FIG. 11B. The spring may be extended when the first connector 76 is engaged to the second connector 78, and the spring may provide a disengagement force when the magnet 46 is operated to disengage the first connector 76 and the second connector 78. Alternatively, the engagement member 86 may comprise at least one reversible magnet disposed such that an engagement and disengagement force may be provided to the first connector 76 as shown in FIG. 11C. The reversible magnet could be operated to provide an engagement force that moves the first connector 76 toward the second connector 78. The reversible magnet could further be operated to provide a disengagement force that moves the first connector 76 away from the second connector 78.

Figure 12A:
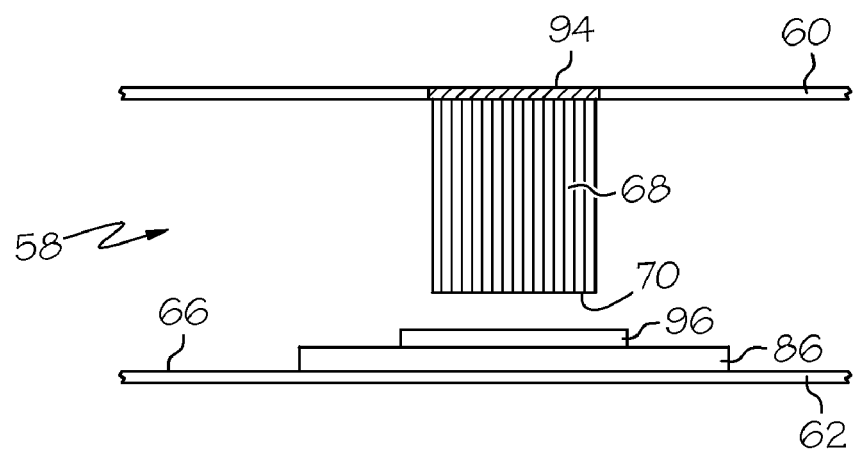
FIGS. 12A-12D illustrate board assemblies incorporating at least one motor in accordance with embodiments of the present invention.
Figure 12C:
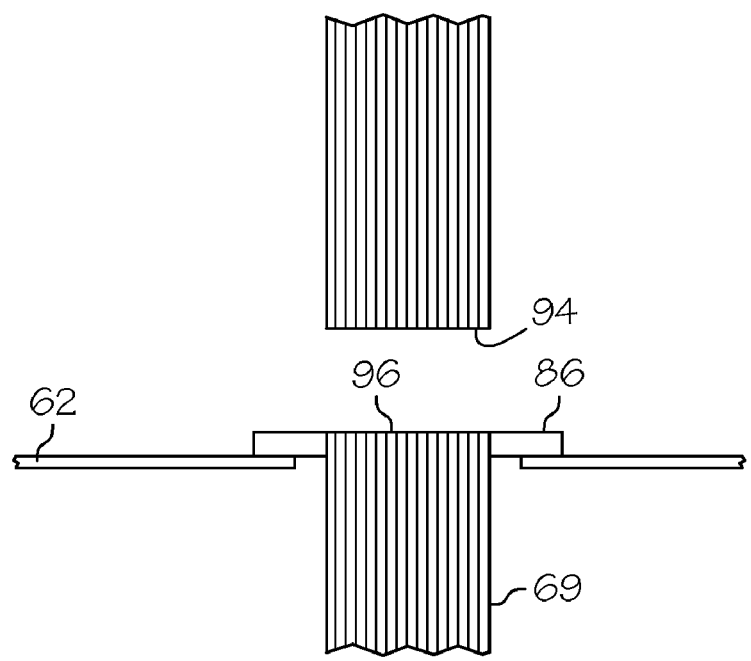
Figure 12B:
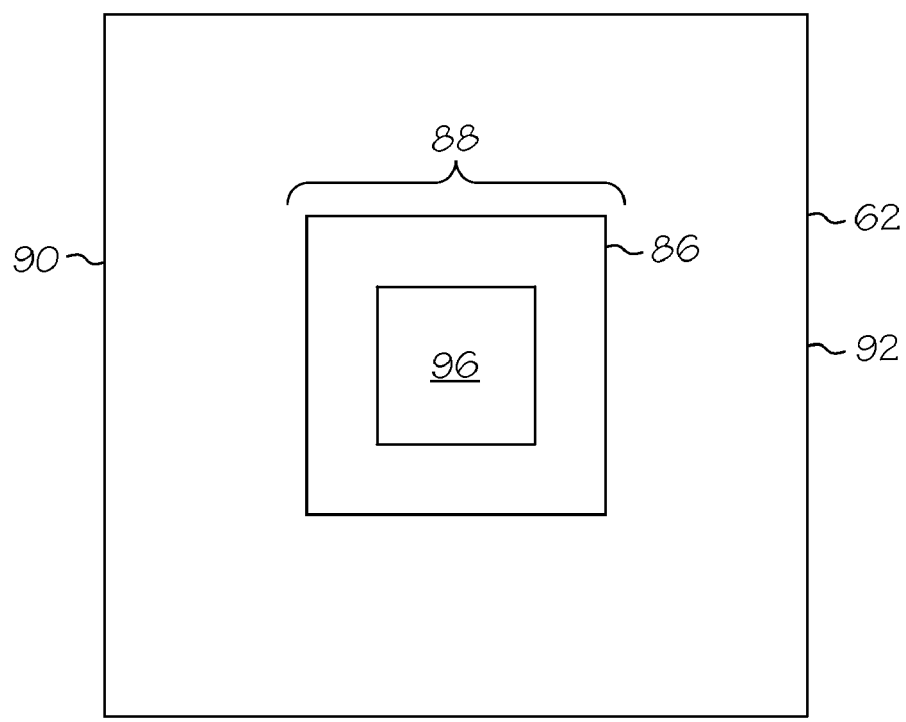
Figure 12D:
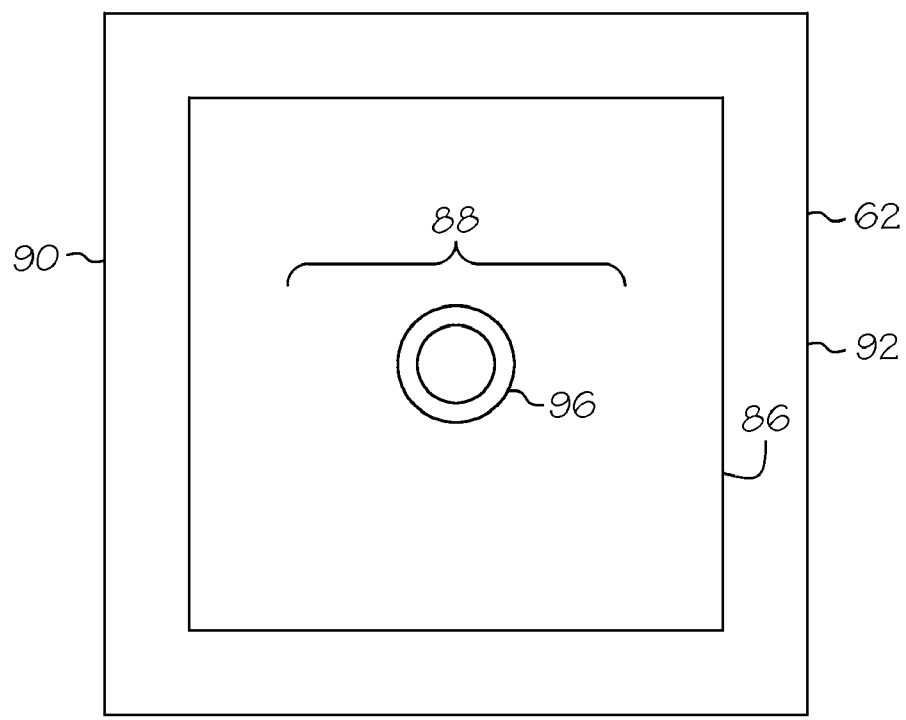

In accordance with another embodiment of the present invention, assemblies having active alignment and methods of forming connections are provided. Referring to FIGS. 12A-12D, the board assembly 58 may have at least one movable stage 86 on a second board 62. The assemblies 58 may have two boards 60, 62 for board to board optical communication as illustrated in FIGS. 12A and 12C. Alternatively, the assemblies 58 may have one board 62 to form a board to fiber 68 optical communication as illustrated in FIGS. 12B and 12D. The at least one movable stage 86 may be disposed on a second board 62. The movable stage 86 is disposed on the second board 62 such that at least one motor (not shown) may steer the movable stage 86 such that the movable stage 86 may be aligned with the second end 70 of the fiber bundle 68 in a desired manner For example, the position of the movable stage 86 may be changed relative to the second end 70 of the fiber bundle 68.

Figure 13A:
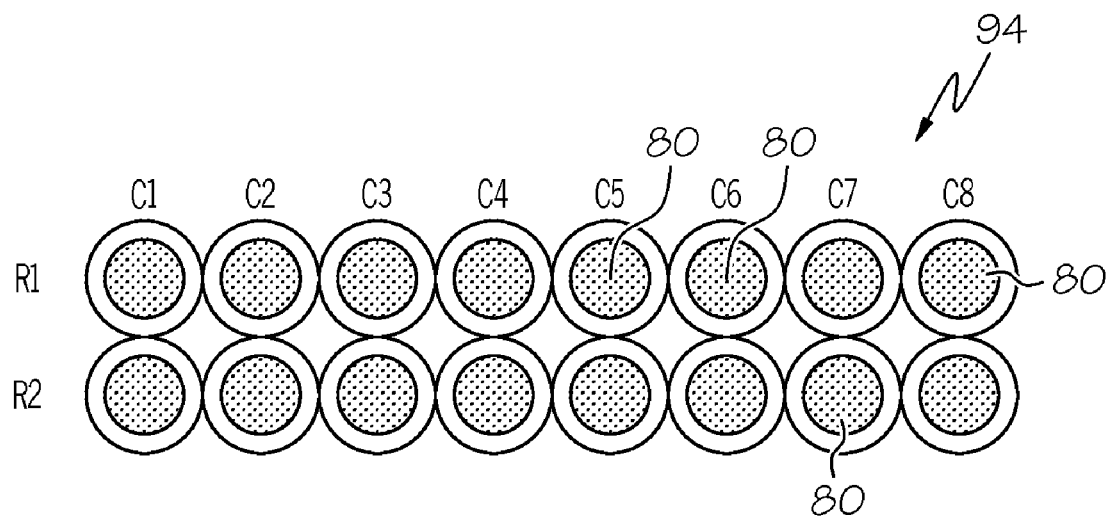
FIGS. 13A-13D illustrate optical arrays and various alignments in accordance with embodiments of the present invention.

The first board 60 and the second board 62 may have a center region 88. The center region 88 may be defined between a front edge 90 and a rear edge 92 of the boards 60 or 62. The center region 88 of the first board 60 may comprise a first optical array 94. Alternatively, the first optical array 94 may be defined by the second end 70 of a fiber bundle 68 that may be connected to any desired structure as shown in FIG. 12C. The first optical array 94 may have a plurality of first array positions 80 as illustrated in FIG. 13A. The optical array 94 may comprise a plurality of emitters or detectors/receivers, and the plurality of emitters or detectors/receivers may have positions that comprise the plurality of first array positions 80. The first array positions 80 may correspond to positions of the plurality of fibers 74 and the fiber bundle may have positions corresponding to the first array positions 80 defined thereon. Thus, the fiber bundle 68 may be connected to the first optical array 94. It will be understood that the array 94 illustrated in FIG. 13A illustrates is only one possible configuration, and the array may have a greater number of positions or a smaller number of positions in any desired configuration.

The movable stage 86 may have a second optical array 96, and the second optical array 96 may comprise a plurality of second array positions 82 as illustrated in FIGS. 12A-12D and FIG. 13B. In accordance with one embodiment, the second optical array 96 may comprise an array of emitters or detectors/receivers as illustrated in FIGS. 12A and 12C. In an alternative embodiment, the second optical array 96 may comprise a fiber bundle 69 as illustrated in FIGS. 12A and 12C. The second optical array 96 may comprise by a fiber bundle 69 having second array positions 82 which may be connected to any desired structure. For example, the fiber bundle 69 may be connected to an array of emitters or detectors/receivers that correspond to the second array positions 82. As illustrated in FIG. 12C, the second board 62 may have a portion through which the fiber bundle 69 may pass and over which the movable stage 86 may be mounted.

Figure 10A:
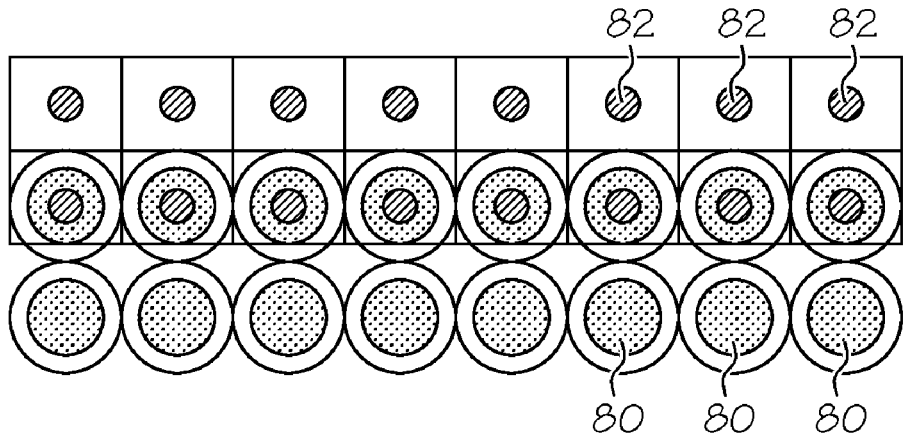
FIGS. 10A-10C illustrate various alignments of array positions.
Figure 10B:
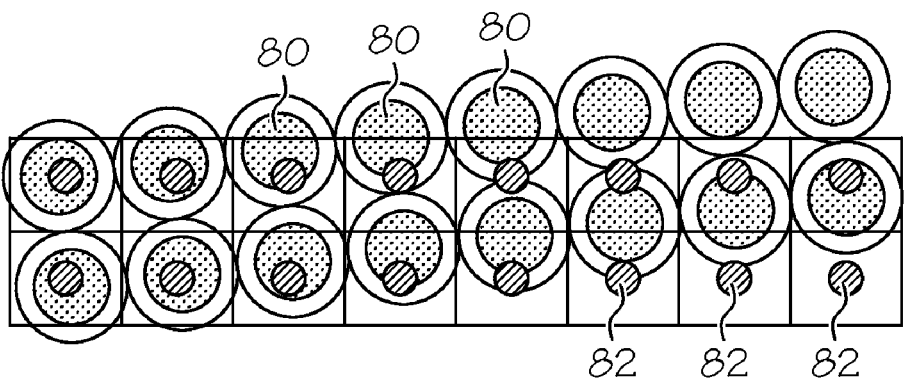
Figure 10C:
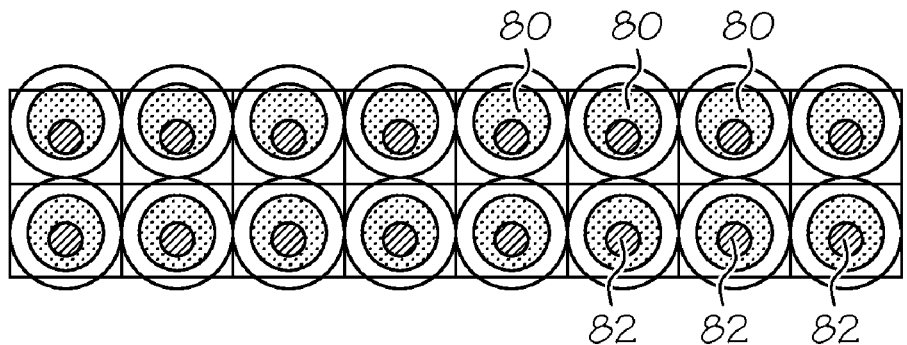

The movable stage 86 may be disposed such that the at least one motor may steer the movable stage such that the second optical array 96 may be aligned with the second end 70 of the fiber bundle 68. For example, the movable stage may be steered such that a desired at least one of the plurality of second array positions 82 may be aligned with a desired at least one of the plurality of first array positions 80. For example, some possible alignments are illustrated in FIGS. 10A-10C as discussed above.

It will be understood that the motor or motors may be disposed in any suitable manner to allow the motors to steer the movable stage 86. For example, the at least one motor may be disposed such that the movable stage 86 may be engaged by the at least one motor. The at least one motor may comprise a portion of the movable stage 86. The at least one motor may comprise a single motor disposed to steer the movable stage in a first direction. The at least one motor could alternatively comprise two motors. The first motor may be disposed to steer the movable stage 86 in a first direction, and the second motor may be disposed to steer the movable stage 86 in a second direction. The at least one motor could additionally comprise a third motor disposed to steer the movable stage 86 in a third direction. The motors may comprise any suitable types of motors. For example, the motors may be microstepper motors.

In one example, each of the first array positions 80 may be emitters, and each of the second array positions 82 may be detectors. Each one of the plurality of emitters 80 may correspond to one of the detectors 82. Signals may be emitted that correspond to the plurality of emitters 80 such that signals are transmitted along the fibers 74 of the fiber bundle 68 to the second end 70 of the fiber bundle 68. The movable stage 86 may then be selectively operated until at least one of the plurality of detectors 82 is aligned with the corresponding signal from at least one the plurality of emitters 80. The movable stage 86 may be selectively operated until each on of the plurality of detectors 82 is aligned with the corresponding signal from the plurality of emitters 80.

In a further example, each of the first array positions 80 may be detectors, and each of the second array positions 82 may be emitters. Each one of the plurality of emitters 82 may correspond to one of the detectors 80. Signals may be emitted that correspond to the plurality of emitters 82. The movable stage 86 may then be selectively operated until at least one of the plurality of detectors 80 is aligned with the corresponding signal from at least one the plurality of emitters 82. The movable stage 86 may be selectively operated until each on of the plurality of detectors 80 is aligned with the corresponding signal from the plurality of emitters 82.

It will be understood that the second end 70 of the fiber bundle 68 need only be positioned proximate to the second array 96 in order for optical communication to be established between the fiber bundle 68 and the second optical array 96. Thus, no direct physical connection between the fiber bundle 68 and the second array 96 needs to be made. Additionally, the fiber bundle 68 need only be grossly aligned with the second array 96 prior to selectively operating the movable stage 86. The assembly 58 may have any suitable mechanical constraint to keep the fiber bundle 68 proximate to the second array 96 if needed. For example, the first or second board 60, 62 may have a bracket (not shown) for engaging the fiber bundle 68. In another example, the first board 60 may have a spring arm (not shown) that may be extended to position the fiber bundle 68 proximate to the second array 96.

Figure 13B:
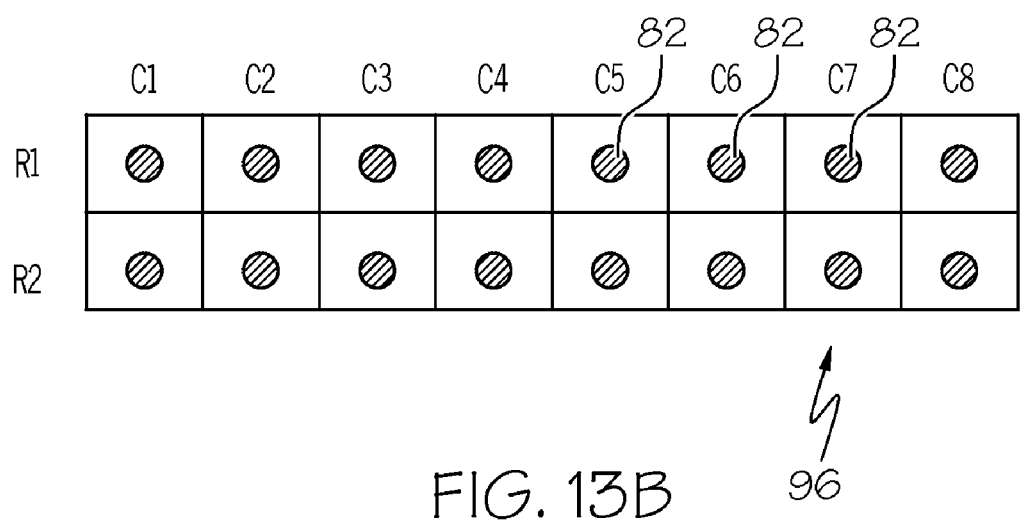

The first array positions 80 may comprise a row location R and a column location C as shown in FIG. 13A. For example, one of the first array positions may comprise R1, C3. It will be understood that the array positions 80 may be configured in any desired manner and there may be any desired number of first array positions 80. The second array positions 82 may comprise a row location R and a column location C as shown in FIG. 13B. Each of the row and column locations of the second array positions 82 may correspond to a row and column location of the first array positions 80. For example, R1, C3 of the first array 94 may correspond to R1, C3 of the second array 96. The movable stage 86 may be selectively operated such that at least one of the row and column locations of the second optical array 96 aligns with at least one of the corresponding row and column locations of the first optical array 94. The movable stage 86 may be selectively operated until each one of the row and column locations of the first array 94 aligns with the corresponding row and column locations of the second array 96.

Figure 13C:
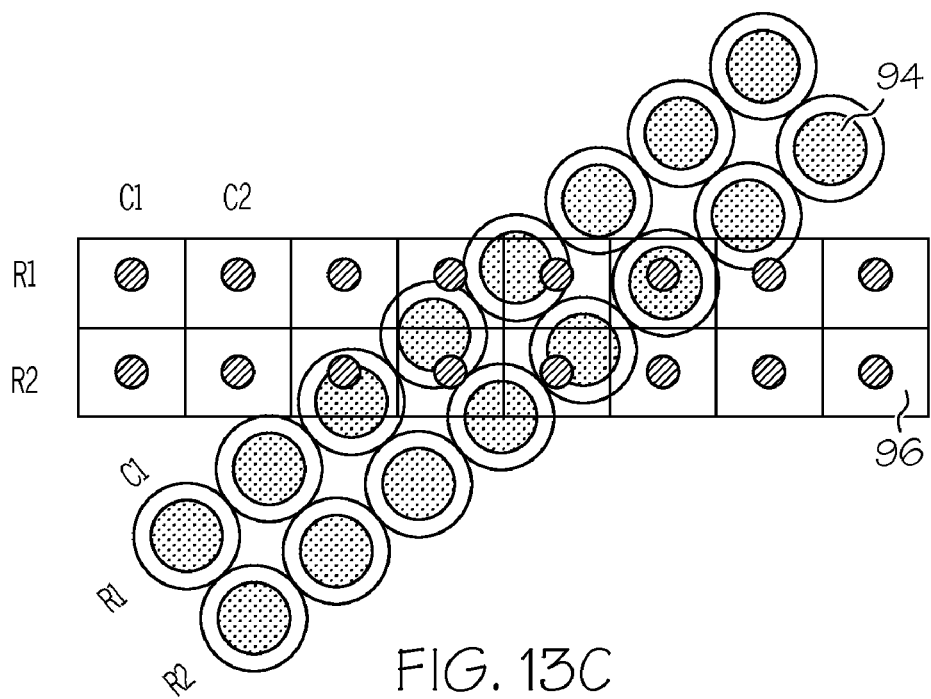
Figure 13D:
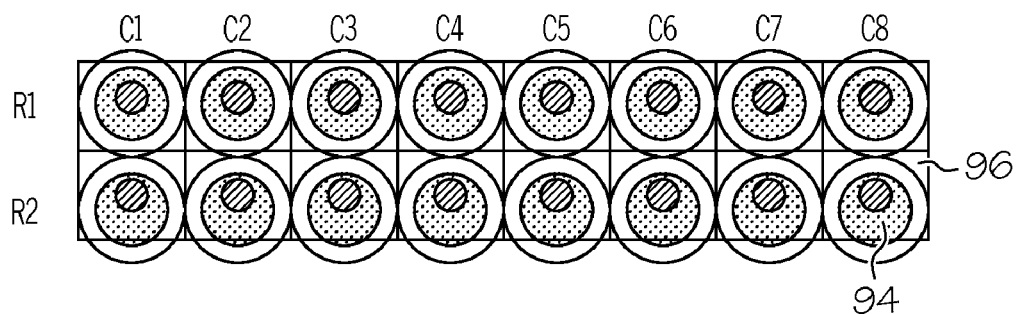

In one example, the center of the first array 94 may be aligned with the center of the second array 96 as shown in FIG. 13C. The movable stage 86 may then be selectively operated until each of the row and column locations of the first array 94 align with the corresponding row and column locations of the second optical array 96 as shown in FIG. 13D. In another example, the movable stage 86 may have a first motor that is disposed to move the movable stage 86 in a column direction and a second motor that is disposed to move the movable stage 86 in a row direction. The movable stage 86 may then be selectively operated until each of the row and column locations of the second optical array 96 align with the corresponding row and column locations of the first optical array 94 as shown in FIG. 13D. In yet another example, the board assembly 58 may have at least one magnet (not shown) that is disposed to move the fiber bundle 68 proximate to the second array 96. After the fiber bundle 68 is moved by the magnet, the at least one movable stage 86 may be selectively operated to align the second array 96 and the fiber bundle 68 in a desired manner. It will be understood that the magnet or magnets may be disposed in any suitable location and the fiber bundle 68 may have a structure, such as a metal structure, upon which the magnetic force may act.

Figure 14:
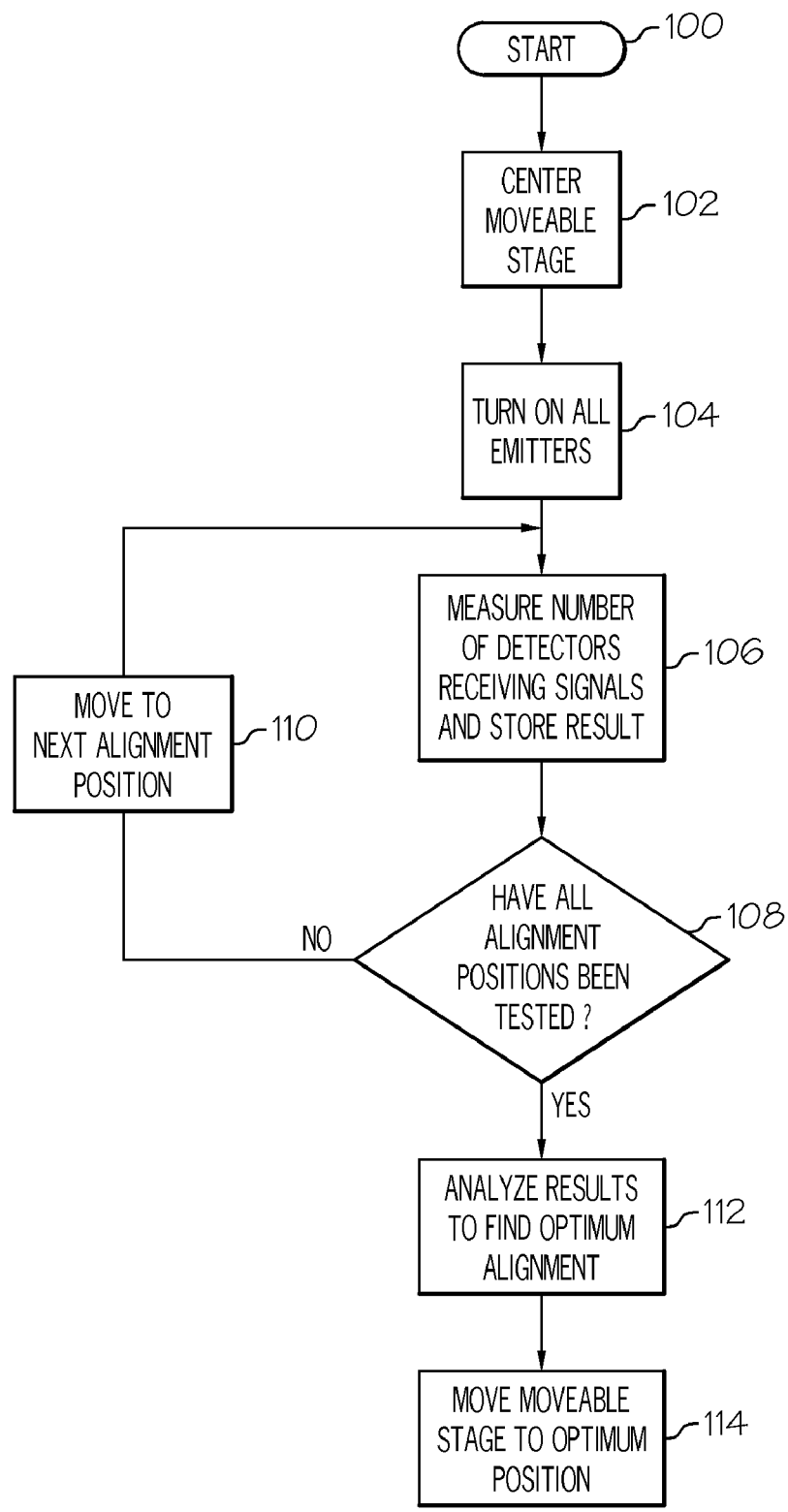
FIG. 14 schematically illustrates an algorithm that may be used in accordance with embodiments of the present invention.

The movable stage 86 and motors may be controlled in any suitable manner. For example, the movable stage 86 and motors may be controlled by at least one algorithm, and the algorithm may be a search algorithm. An example of a suitable algorithm is shown in FIG. 14. The algorithm may start at step 100, and the movable stage 86 may be centered in step 102. All the emitters from either the fiber bundle 68 side or the second array 96 side may be turned on in step 104. The number of detectors receiving signals may be measured and the result may be stored in step 106. Next, the algorithm may question whether all alignment positions have been tested in step 108. If the answer is no, the movable stage may move to the next alignment position in step 110 and steps 106 and 108 may be repeated. If the answer is yes, the results may be analyzed to find the optimum alignment in step 112, and the movable stage may be moved to the optimum alignment position in step 114.

It will be understood that the alignment of the movable stage 86 with the second end 70 of the fiber bundle may be performed at any desired time throughout the operation of the assembly 58. For example, the alignment may be periodically performed to ensure that vibrations or other movements do not cause undue misalignment and loss of optical communication.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. For example, the fiber assemblies can comprise a plurality of fibers, cores, connectors, magnets, and the like. It will be further understood that the board assemblies can comprise a plurality of boards, fiber bundles, connectors, optical arrays, magnets, engagement members, and the like. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. An assembly, comprising a first board, a second board, a fiber bundle, and at least one movable stage, wherein:
   said fiber bundle comprises a first end and a second end;
   said first end of said fiber bundle is attached to a face of said first board;
   said movable stage comprises a second optical array; and
   said at least one movable stage is disposed on said second board such that said at least one movable stage selectively repositions said second optical array with respect to said second board such that said second optical array is aligned with said second end of said fiber bundle.

2. The assembly as claimed in claim 1 wherein said second optical array comprises an array of emitters or detectors.

3. The assembly as claimed in claim 1 wherein said second optical array comprises a fiber bundle.

4. The assembly as claimed in claim 1 wherein said fiber bundle is connected to a first optical array.

5. The assembly as claimed in claim 4 wherein said first optical array comprises an array of emitters, and wherein said second optical array comprises an array of detectors.

6. The assembly as claimed in claim 4 wherein said first optical array comprises an array of detectors, and wherein said second optical array comprises an array of emitters.

7. An assembly, comprising a first board, a second board, a fiber bundle, and at least one movable stage, wherein:
   said fiber bundle comprises a first end and a second end;
   said first end of said fiber bundle is attached to a face of said first board;
   said movable stage comprises a second optical array; and
   said at least one movable stage is disposed on said second board such that said second optical array is aligned, by the at least one movable stage, with said second end of said fiber bundle;
   said first board further comprises a front edge, a rear edge, and a center region defined on a first face of said first board between said front edge and said rear edge,
   said center region on said first board contains said attached fiber bundle;
   said second board further comprises a front edge, a rear edge, and a center region defined on a second face between said front edge and said rear edge; and
   said center region on said second board contains said at least one movable stage.

8. The assembly as claimed in claim 7 wherein said first face of said first board is parallel to said second face of said second board.

9. An assembly, comprising:
   a first board comprising a first face and a center region on said first face, wherein at least a portion of said center region comprises a first optical array comprising a plurality of first array positions;
   a second board comprising a second face and a center region on said second face, wherein at least a portion of said center region comprises a movable stage having a second optical array comprising a plurality of second array positions;
   a fiber bundle comprising a plurality of fibers and having at least a first end and a second end, wherein said first end of said fiber bundle is attached to said first board first face such that said fiber bundle comprises said plurality of first array positions; and
   at least one motor disposed to move said movable stage such that said at least one motor steers said movable stage such that said second optical array is aligned with said second end of said fiber bundle, wherein said alignment occurs such that at least one of said plurality of first array positions is aligned with a desired at least one of said plurality of second array positions.

10. The assembly as claimed in claim 9 wherein said first board further comprises a front edge and a back edge, and wherein said center region of said first board is defined between said front edge and said back edge.

11. The assembly as claimed in claim 9 wherein said second board further comprises a front edge and a back edge, and wherein said center region of said second board is defined between said front edge and said back edge.

12. The assembly as claimed in claim 9 wherein said first board first face is parallel to said second board second face.

13. The assembly as claimed in claim 9 wherein said first board comprises a printed circuit board and wherein said second board comprises a printed circuit board.

14. The assembly as claimed in claim 9 wherein said at least one motor comprises a microstepper motor.

15. The assembly as claimed in claim 9 wherein said second board assembly comprises a first motor disposed to steer said movable stage in a first direction.

16. The assembly as claimed in claim 9 wherein said second board assembly comprises a first motor disposed to steer said moveable stage in a first direction and a second motor disposed to steer said movable stage in a second direction.

17. The assembly as claimed in claim 9 wherein said second board assembly comprises a first motor disposed to steer said movable stage in a first direction, a second motor disposed to steer said movable stage in a second direction, and a third motor disposed to steer said movable stage in a third direction.

18. The assembly as claimed in claim 9 wherein said fiber bundle comprises a first connector on said first end connected to said first optical array.

19. The assembly as claimed in claim 18 wherein said at least one motor comprises at least a portion of said movable stage.

20. The assembly as claimed in claim 9 wherein said assembly further comprises a plurality of said first boards, said second boards, said fiber bundles, said stages, and said motors.

21. The assembly as claimed in claim 9 wherein
   said first board further comprises a plurality of said first arrays;
   said second board further comprises a plurality of said stages having said second arrays and a plurality of at least one motors;
   said assembly further comprises a plurality of said fiber bundles;
   one of said plurality of said fiber bundles is attached to a selected one of said plurality of said first arrays; and
   said plurality of at least stages are disposed on said second board first face such that each of a selected one of said plurality of at least one motors steers one of said plurality of said stages such that said one of said plurality of fiber bundles aligns with one of said plurality of said second arrays.

22. An assembly comprising a fiber bundle and a board having at least one movable stage disposed thereon, wherein:
   said fiber bundle comprises a first end;
   said movable stage comprises an optical array; and
   said at least one movable stage is disposed on said board such that said movable stage selectively repositions said optical array relative to said board such that said optical array is aligned with said first end of said fiber bundle.

23. The assembly of claim 22, wherein said optical array provides optical data communication for elements on said board.

\* \* \* \* \*